Patented Jan. 29, 1935

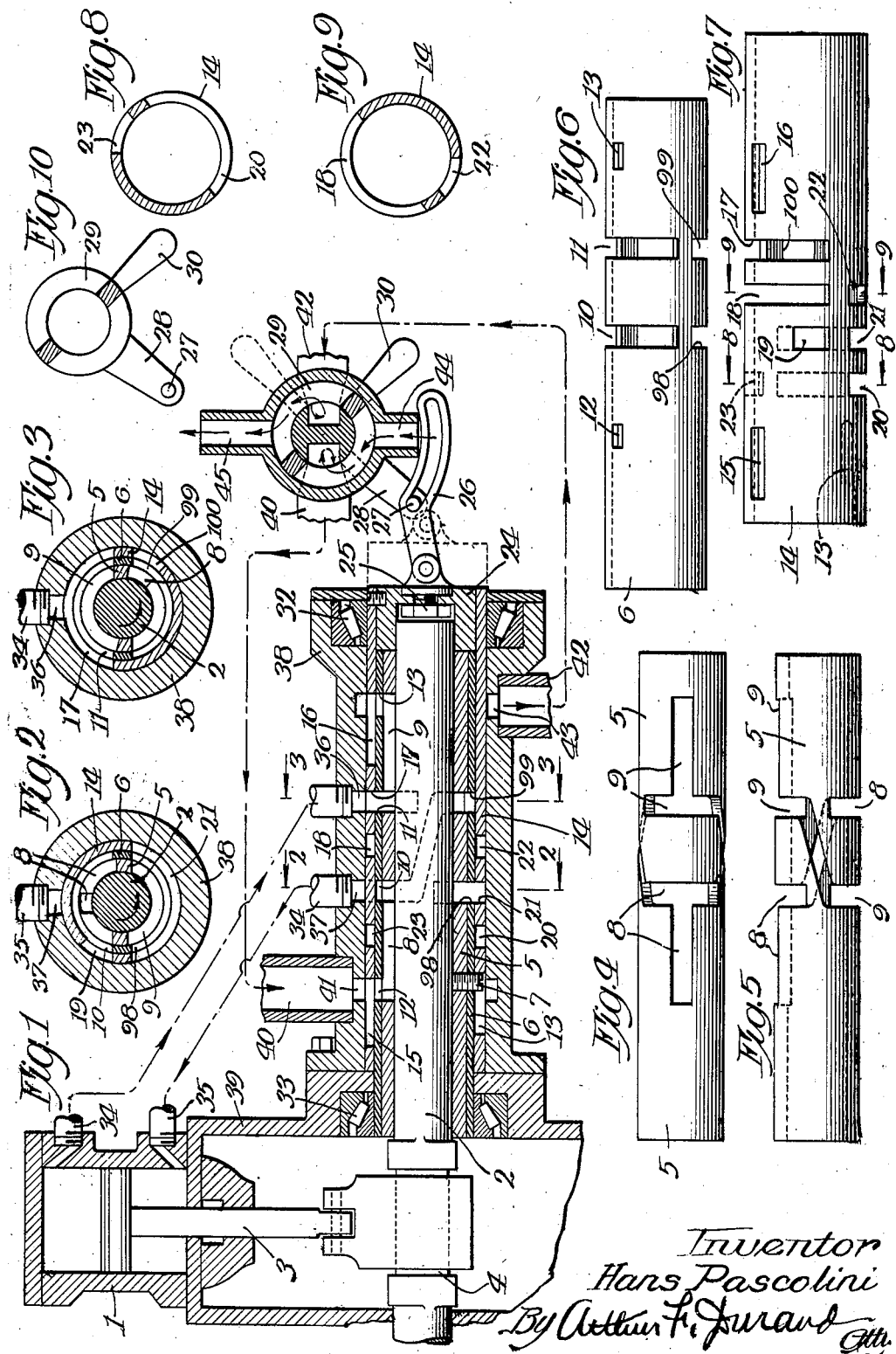

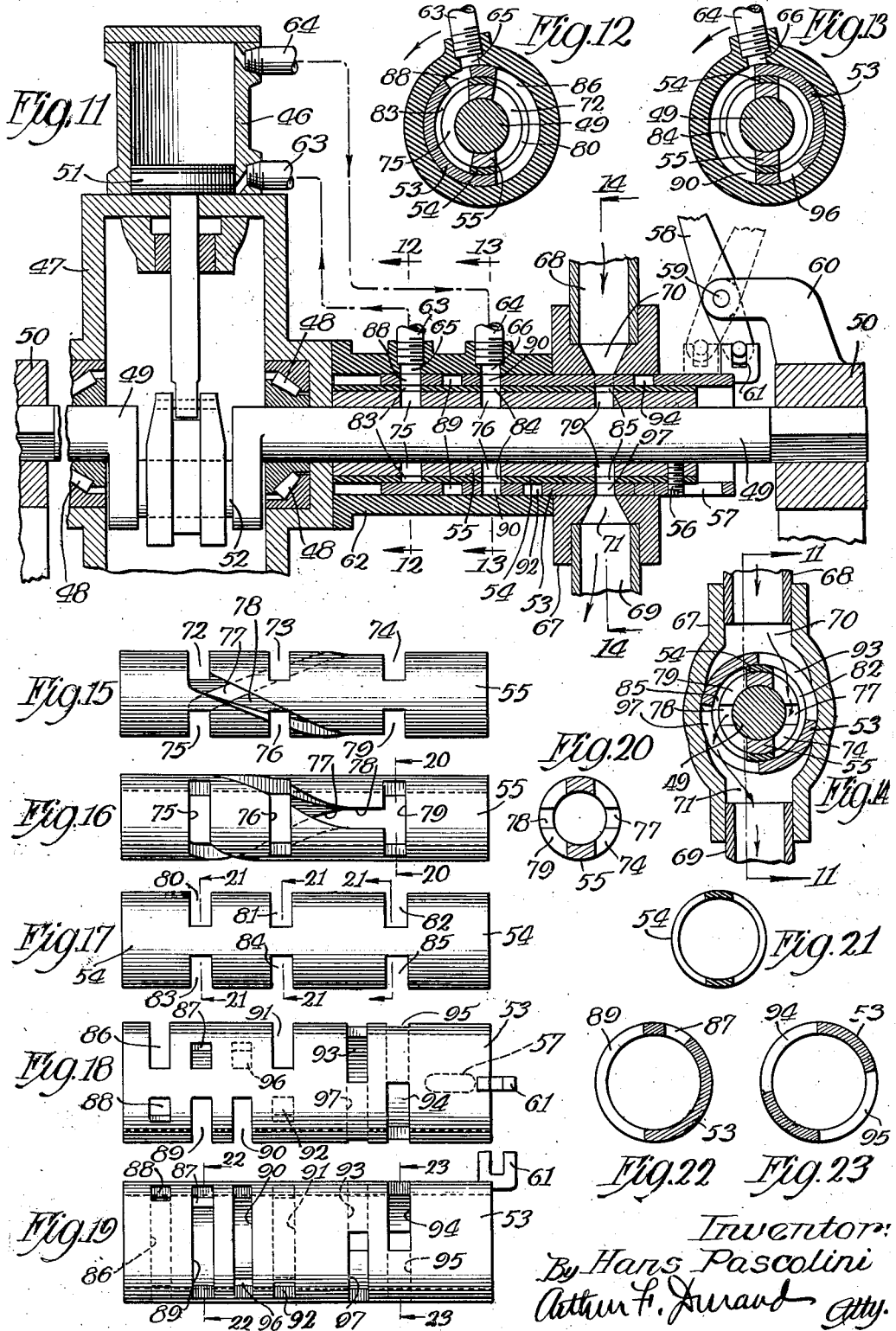

1,989,212

UNITED STATES PATENT OFFICE 1,989,212

FLUID PRESSURE MOTOR

Hans Pascolini, Chicago, Ill.

Application January 23, 1932, Serial No. 588,303

7 Claims. (Cl. 121—121)

This invention relates to fluid pressure motors or engines, and more particularly to those having radially arranged cylinders.

Generally stated, the object of the invention is to provide a novel and improved construction and arrangement whereby the steam or other fluid pressure is controlled by a rotary valve on the crank shaft of the motor or engine, of such character that it is not necessary to make the shaft hollow, or to provide any passages in the shaft itself, regardless of whether the latter is stationary or rotary, the invention contemplated being applicable to either a radial cylinder engine in which the shaft rotates, or to a radial cylinder engine in which shaft is held stationary, while the cylinders themselves rotate or revolve.

It is also an object to provide a novel and improved construction and arrangement, preferably involving a plurality of sleeves having ports or passages therein, arranged on the engine shaft, and means for relatively adjusting said sleeves to reverse the direction of drive of the engine.

It is also an object to provide certain details and features of construction and combinations tending to increase the general efficiency and the desirability of a fluid pressure motor or engine of this particular character.

To the foregoing and other useful ends, the invention consists in matters hereinafter set forth and claimed and shown in the accompanying drawings, in which—

Fig. 1 is an axial section of a fluid pressure motor or engine involving the principles of the invention, as embodied in an engine having stationary radially arranged cylinders and a rotary crank shaft, for convenience of illustration only one cylinder being shown, the other cylinder or cylinders being shown broken away for convenience of illustration, but each one being like the one shown in section.

Fig. 2 is a detail section on line 2—2 in Fig. 1 of the drawings.

Fig. 3 is a similar section on line 3—3 of Fig. 1 of the drawings.

Fig. 4 is a side elevation of one of the valve sleeves of said engine.

Fig. 5 is a similar view showing a different side of said sleeve.

Fig. 6 is a similar view of another sleeve or cylinder of the valve mechanism.

Fig. 7 is a similar view of another or third sleeve of said valve mechanism.

Fig. 8 is a detail transverse section on line 8—8 in Fig. 7 of the drawings.

Fig. 9 is a similar section on line 9—9 in Fig. 7 of the drawings.

Fig. 10 is a detail of a portion of the valve mechanism shown at the right in Fig. 1 of the drawings.

Fig. 11 is a view similar to Fig. 1, showing a different form of the invention, the cylinders in this case being rotary, for convenience of illustration only one cylinder being shown, the other cylinder or cylinders being shown broken away for convenience of illustration, but each one being like the one shown in section.

Fig. 12 is a section on line 12—12 in Fig. 11 of the drawings.

Fig. 13 is a similar section on line 13—13 in Fig. 11 of the drawings.

Fig. 14 is a similar section on line 14—14 in Fig. 11 of the drawings.

Fig. 15 is a side elevation of one of the sleeves of the valve mechanism shown in Fig. 11 of the drawings.

Fig. 16 is a side elevation showing a different side of the same sleeve.

Fig. 17 is a similar view of another sleeve of said valve mechanism.

Fig. 18 is a side elevation of still another or third sleeve of said valve mechanism.

Fig. 19 is a similar view showing a different side of the sleeve shown in Fig. 18 of the drawings.

Fig. 20 is a transverse section on line 20—20 in Fig. 16 of the drawings.

Fig. 21 is a transverse section on line 21—21 in Fig. 17 of the drawings.

Fig. 22 is a transverse section on line 22—22 in Fig. 19 of the drawings.

Fig. 23 is a transverse section on line 23—23 in Fig. 19 of the drawings.

As thus illustrated, referring to Figs. 1 to 10, inclusive, the invention comprises a plurality of cylinders 1 arranged radially around the crank shaft 2, with the pistons 3 of said cylinders suitably connected to the crank 4 of said shaft, the engine in this case having stationary radially arranged cylinders and a rotary crank shaft.

The two sleeves 5 and 6 are keyed by a screw 7 to said shaft. The sleeve 5 has ports or passages 8 and 9 therein, as shown in Figs. 4 and 5 of the drawings. The sleeve 6 has the ports or passages 10, 11, 12 and 13 therein, as shown in Fig. 6 of the drawings. There is a third or outer sleeve 14 that has the ports or passages 15, 16, 17, 18, 19, 20, 21, 22 and 23, as shown in Fig. 7 of the drawings. It will be seen that the outer sleeve 14 is keyed to the member 24, and that the latter has a swivel connection 25 with the lost motion link 26, the slot of which is engaged by the pin 27 on the arm 28 of the rotatable valve mechanism 29, a handle 30 being provided for rotating or oscillating this valve mechanism, and to thereby pull the member 24 and the sleeve 14 outwardly a distance, after the lost motion is taken up, in the manner shown in dotted lines in Fig. 1 of the drawings. As the screw 7 extends into the slot 31 of the sleeve 14, it is obvious that all three sleeves rotate with the shaft, but that only the sleeve 14 is capable of endwise or axial displacement, by the handle 30 previously mentioned.

The sleeve 14, it will be seen, is supported to rotate in roller bearings 32, and the other end of the sleeve 6 is supported for rotation in the ball bearings 33, of any suitable character.

Each cylinder has the two inlet and outlet pipes 34 and 35, leading respectively to the ports or openings 36 and 37 in the outside tubular hub or sleeve 38, which latter is rigid with the crank casing 39 on which the cylinders are supported.

It will also be seen that the valve mechanism 29 has a pipe 40 that leads to the port or opening 41 in said hub or sleeve 38, and has another pipe 42 that leads to the port or opening 43 in said outer sleeve or hub.

The valve mechanism 29 has a steam or fluid pressure inlet 44, and an exhaust outlet 45, and with the valve mechanism 29 and the sleeve valve mechanism on the shaft 2 set as shown in Fig. 1, steam or fluid pressure is entering the engine valve mechanism through the pipe 40, and is leaving said valve mechanism through the pipe 42, in the manner indicated by the arrow lines. Should the handle 30 be moved into the position shown in dotted lines, the valve mechanism 29 will be reversed, and so will the sleeve mechanism on the shaft, with the result that the flow of steam or fluid pressure will be in the reverse direction, for in such case the steam would enter through the pipe 42, and would leave through the pipe 40, which is obvious from the construction of the valve mechanism, as shown in the drawings, the different ports and passages of the valve mechanism being located in a manner to produce that effect.

Referring to Figs. 11 to 23, inclusive, the construction here shown is similar to that previously described, but in this case the engine is a rotary or revolving cylinder affair, the crank shaft being held against rotation. In this construction, the radial cylinders 46 are mounted on the rotary crank casing 47, being supported by the antifriction bearings 48, of any suitable character. The end portions of the crank shaft 49 are held against rotation in bearings 50, and the pistons 51 of the various cylinders are suitably connected to the crank 52 of said shaft, whereby the operation of said pistons in their respective cylinders, by the steam or other fluid pressure, serves to rotate or revolve the cylinders about the axis of said shaft. The three sleeves 53, 54 and 55 are arranged upon the shaft, as shown in Fig. 11 of the drawings, and the two sleeves 54 and 55 are keyed to the shaft by the screw 56, while the outer end of this screw engages a slot 57 in the outer sleeve 53, whereby the latter is adapted to be shifted axially or endwise.

For the purpose of shifting the sleeve 53, a hand-lever 58 is pivoted at 59 on a stationary bracket 60, and the lower end of this hand-lever has suitable engagement with the bracket end portion 61 of the sleeve 53, whereby operation of said hand-lever will shift said sleeve endwise on the sleeve 54, in a manner that will be readily understood.

An outer sleeve 62 is provided, to partially cover the sleeve 53, and this outer sleeve 62 is connected by pipes 63 and 64 with the radial cylinders 46, previously mentioned. There are two of these pipes, it will be understood, for each cylinder of the engine. The pipe 63 leads to the opening or port 65 in the sleeve 62, while the pipe 64 leads to the opening or port 66 in the sleeve 62, as shown in Fig. 11 of the drawings.

The ringlike sleeve 67 is also stationary on the sleeve 53, and is provided with an inlet fluid pressure pipe 68, and an exhaust outlet pipe 69 at its other side. This ring sleeve 67 has the inlet port 70, and the outlet port 71, as shown, whereby the live steam is conducted to the sleeve valve mechanism, and exhaust steam is conducted therefrom.

As shown in Figs. 15 and 16, the sleeve 55 has the fluid pressure ports or passages 72, 73, 74, 75, 76, 77, 78 and 79 therein, to control the fluid pressure. As shown in Fig. 17 of the drawings, the sleeve 54 has the steam ports or passages 80, 81, 82, 83, 84 and 85, formed in the sides thereof. As shown in Figs. 18 and 19, the sleeve 53 has the steam ports or passages 86, 87, 88, 89, 90, 91, 92, 93, 94, 95, 96, and 97 formed in the sides thereof. With these sleeves formed in the manner shown, and arranged concentrically together, as shown in Fig. 11 of the drawings, steam or other fluid pressure will enter the valve mechanism through the pipe 68, and will flow through the ports and passages of said valve mechanism, and will enter the cylinders and escape therefrom in the manner shown by the arrow lines in Fig. 11 of the drawings. If the hand-lever 58 is then shifted into its other position, as indicated in dotted lines, the flow of steam or other fluid pressure will be controlled in such manner that the motion of the engine will be reversed.

From the foregoing, therefore, it will be seen that, in each form of the invention, there is a cylindrical valve mechanism, on the shaft of the engine, for first admitting steam to one end of each cylinder, and then to the other end, to drive the engine. In one form of the invention, where the cylinders are stationary, the rotation of the shaft operates the cylindrical valve mechanism to alternately cut off and exhaust the steam to and from the opposite ends of the cylinders. In the other form of the invention, where the cylinders rotate, the cylindrical valve mechanism, the three sleeves thereof, is stationary, being held stationary by the non-rotary shaft, and only the outside sleeve or valve casing is rotated by the revolving cylinders. In each form of the invention, some portion of the cylindrical valve mechanism is rotated by the engine, to alternately cut off and exhaust the steam to and from the opposite ends of the cylinders, in the manner indicated in the drawings. Also, in each form of the invention, one of the sleeves of the valve mechanism is movable or shiftable endwise to reverse the motion of the engine. These results are accomplished by using valve mechanism sleeves having the ports and passages and openings therein, shown and described in the drawings. In Fig. 1, an auxiliary valve mechanism 29 is preferably employed, in conjunction with cylindrical valve mechanism, to reverse the motion of the engine; but in Fig. 11 of the drawings, no auxiliary valve mechanism is necessary, as the shifting of the sleeve 53 is sufficient to reverse the motion of the engine.

While only one cylinder is shown in Fig. 1 of the drawings, and only one cylinder is shown in Fig. 11 of the drawings, it will be understood that as many radial cylinders may be employed as is necessary or desirable. In Fig. 1, the outer or stationary housing 38 will have as many pairs of pipes 34 and 35 as there are radial cylinders in this form of the invention, said pipes being spaced apart circumferentially on the housing 38, whereby the rotation of the valve cylinders causes the steam to be admitted alternately to the successive cylinders, and to be exhausted therefrom, thereby to rotate the shaft 2 of this form of the invention. In Fig. 11 of the drawings, all three sleeves of the valve mechanism are held against rotation, and the outer sleeve housing 62 will have as many pairs of pipes 63 and 64 as there are radial cylinders in this form of the invention. The rotation of this housing 62, with its ports 65 and 66 for each pair of pipes, will cause the steam to be admitted successively to the revolving cylinders, alternately to opposite ends of each cylinder, thereby to drive the engine in one direction. Then, if the sleeve 53 is shifted endwise, the flow of steam in the valve mechanism will be controlled to cause a reversal of the motion of the engine.

Therefore, the showing in Figs. 1, 2 and 3, is in effect diagrammatic, as only one radial cylinder is shown. But it will be understood that the other radial cylinders will be like the one shown, and that when more than one cylinder is employed, there will be a pair of ports 36 and 37 for each cylinder, in the housing 38 of the valve mechanism. For the purpose of simplification of the drawings, only one port 36 is shown in Fig. 3, and only one port 37 is shown in Fig. 2 of the drawings, but when a plurality of radial cylinders is employed, there will be as many of these ports as there are cylinders, disposed equi-distant around the circumference of the housing 38, which latter in Figs. 1, 2 and 3, is rigid with and stationary with the cylinders and cylinder mounting or crank casing 39, as previously explained.

With a plurality of cylinders, it will be understood that each pair of ports 36 and 37 will come successively into operative relation with the ports of the sleeve 14, and the ports and passages of the sleeves 5 and 6, whereby steam or fluid pressure is first admitted at one end of each cylinder, and is at the same time exhausted from the other end of the same cylinder, and whereby, when the piston has reached the limit of its stroke, the admission and exhaust of fluid pressure to and from the cylinder is then reversed, thereby to cause reciprocation of the piston in each cylinder in the opposite direction. Such reversal of the admission of steam to and from each cylinder occurs at diametrically opposite points in the rotation of the crank shaft 2, it will be obvious, as it requires a half rotation of this crank shaft to reciprocate the piston from one end of the cylinder to the other. Likewise, Figs. 11, 12 and 13 of the drawings are in effect diagrammatic, to simplify the illustration of the invention, but in actual practice it will be understood that as many radial cylinders may be employed as is necessary or desirable, and that there will be a pair of ports 65 and 66 for each radial cylinder, in the rotary valve housing 62, previously described, these ports being arranged radially and equi-distant in the cylindrical walls of the rotary valve housing, whereby each pair of pipes 63 and 64 cooperates with the ports and passages of the sleeves 53, 54 and 55, to alternately reverse the admission of steam or fluid pressure to and from each cylinder, such reversal occurring at diametrically opposite points in the complete rotation or revolution of the cylinders.

Therefore, it is the relative rotation between the valve sleeves that are keyed by a set screw to the crank shaft, the relative rotation between these sleeves and the outer cylindrical valve casing, that produces the automatic reversal of the admission of steam or fluid pressure to and from the opposite ends of each radial cylinder. In each form of the invention, the three valve sleeves are keyed by a set screw (7 or 56) to the crank shaft, and while in one case the crank shaft is non-rotary, and in the other case it is rotary, the result is substantially the same in each case, inasmuch as in each form of the invention there is relative rotation between the shaft and the radial cylinders, and between the shaft and the outer cylindrical valve casing. The reversal of the motion of the engine, however, is under manual control, and in each case is accomplished by endwise movement or adjustment of the outermost of the three telescoped valve sleeves, in the manner shown and described.

Obviously, the size and shape and location and formation of the various ports and passages shown in the sleeves shown in Figs. 4, 5, 6, and 7 of the drawings, and also shown in Figs. 15, 16, 17, 18, and 19 of the drawings, are not susceptible of much description, and the said drawings, plus the description of the mode of operation of the engine, are relied upon to accurately disclose these features of the invention, and any engine built substantially in accordance with said illustrative drawings will necessarily have the mode of operation previously described.

Preferably, the sleeve 53 has additional ports 96 and 97, as shown, co-operating with said other ports to insure the mode of operation described. It will also be seen that the sleeve 6 preferably has the additional ports 98 and 99, and that the sleeve 14 has the additional port 100, all shaped and located to co-operate with said other ports and passages to insure the mode of operation described. And, in this connection, it will be seen that Fig. 11 of the drawings is a section taken on line 11—11 in Fig. 14 of the drawings, and that Fig. 21 is a section on any one of the three lines 21—21 in Fig. 17 of the drawings.

In the operation, in one direction of rotation, of the stationary cylinder type of engine, Fig. 1, the passage of steam to the inner end of the cylinder is as follows:

Intake—through pipe 44, reversing valve 29, pipe 40, ports 41, 15, 12, 8, 10, 19, 37, pipe 35 into the inner end of cylinder 1 where steam forces the piston outwardly; exhaust—from cylinder 1 through pipe 35, ports 37, 21, 98, 9, 13, 16, 43, pipe 42 through reversing valve and pipe 45. The steam to the outer end of cylinder is as follows: intake—through pipe 44, reversing valve 29, pipe 40, ports 41, 15, 12, 8, 99, 100, 36, pipe 34 into the outer end of cylinder where the steam forces the piston inwardly; exhaust—from cylinder 1 through pipe 34, ports 36, 17, 11, 9, 13, 16, 43, pipe 42, reversing valve and pipe 45. In the reverse direction of rotation the handle 30 and the sleeve 14 are moved to dotted line position in Fig. 1 and the passage of steam to the inner end of cylinder is as follows: intake—through pipe 44, reversing valve 29, pipe 42, ports 43, 16, 13, 9, 98, 20, 37, pipe 35, into inner end of cylinder;

exhaust—from cylinder through pipe 35, ports 37, 23, 10, 8, 12, 15, 41, pipe 40, reversing valve 29 and pipe 45. The passage of steam to the outer end of cylinder is as follows: intake—through pipe 44, reversing valve 29, pipe 42, ports 43, 16, 13, 9, 11, 18, 36, pipe 34 into outer end of cylinder; exhaust stroke—from cylinder through pipe 34, ports 36, 22, 99, 8, 12, 15, 41, pipe 40, reversing valve 29 and pipe 45.

It will be noted that the steam intake ports 20, 19, 18, and 100 in sleeve 14 are relatively short so as to cut-off the supply of steam to cylinder at the proper time, the amount of steam admitted through said ports being sufficient, upon expansion, to actuate the piston.

In the operation, in one direction of rotation, of the revolving cylinder type of engine, Fig. 11, the passage of steam to the inner end of cylinder is as follows: intake—through pipe 68, ports 70, 93, 82, 74, 77, 75, 83, 88, 65, pipe 63 into inner end of cylinder 46; exhaust—from cylinder 46, through pipe 63, ports 65, 86, 80, 72, 78, 79, 85, 97, 71, and pipe 69. The passage of steam to the outer end of cylinder is as follows: intake—through pipe 68, ports 70, 93, 82, 74, 77, 73, 81, 96, 66, pipe 64, into outer end of cylinder; exhaust—from cylinder 46, through pipe 64, ports 66, 90, 84, 76, 78, 79, 85, 97, 71, and pipe 69. In the reverse direction of rotation the handle 58 and sleeve 53 are moved to the dotted position (Fig. 11) and the passage of steam to the inner end of the cylinder is as follows: intake—from supply through pipe 68, ports 70, 94, 85, 79, 78, 72, 80, 87, 65, pipe 63 into inner end of cylinder; exhaust—from cylinder 46, through pipe 63, ports 65, 89, 83, 75, 77, 74, 82, 95, 71, and pipe 69. The passage of steam to the outer end of cylinder is as follows: intake—from supply through pipe 68, ports 70, 94, 85, 79, 78, 76, 84, 92, 66, pipe 64 into outer end of cylinder 46; exhaust—from cylinder through pipe 64, ports 66, 91, 81, 73, 77, 74, 82, 95, 71, and pipe 69.

It will be noted that the steam intake ports 87, 88, 92, and 96 in sleeve 53 are relatively short so as to cut-off the supply of steam to cylinder at the proper time, the amount of steam admitted through said ports being sufficient, upon expansion, to actuate the piston.

It is obvious, of course, that the two sleeves which are rigidly fixed to the shaft, in either form of the invention, in reality constitute one sleeve, but there are obvious advantages in having this sleeve formed or constructed in two parts, one part telescoped over the other in the manner shown and described. For example, if only one integral sleeve was employed, it would be difficult if not impossible to cut some of the passages and ports therein, but by using two sections, one telescoped over the other, each section can be made separately, in an inexpensive and convenient manner, and the outer section can then be shrunk on the inner section. Thus, while there are three structurally separate or distinct sleeves in each form of the invention, it is true that two of these sleeves form in effect one cylinder or sleeve in the operation of the engine, for the purpose of accurate and inexpensive manufacture of the invention, and this inner sleeve is preferably made in two sections, so that the ports and passages may be more accurately and more expeditiously formed therein.

It will also be seen that the function of the outermost or axially movable sleeve, in each form of the invention, is threefold at least, as it not only functions as a cut-off valve for causing steam expansion in the cylinders, but it also serves for throttling and shutting-off the flow of steam, as well as for reversing the engine. And, in each form of the invention it is possible, by adjustment of the axially movable sleeve, to cause the engine to operate either forward or backward with steam expansion, or other fluid expansion, in each cylinder of the engine. This feature of expansion is important, for obvious reasons, and expansion of the steam or other fluid is broadly new in an engine of this general type, in either form of the invention.

What I claim as my invention is:

1. In a double-acting fluid pressure engine of the type having radially arranged cylinders and a crank shaft to which all of the pistons are connected, a single fluid pressure controlling valve mechanism sleeved on said shaft for cutting off the admission and causing expansion of the fluid in each end of the cylinder, comprising a plurality of telescoped concentric sleeves on said shaft keyed together and to said shaft to prevent relative rotation between them and to prevent relative rotation between each sleeve and the shaft, with co-operating ports and passages in the sides of said sleeves, two of said sleeves being rigidly but removably fixed on said shaft and one other sleeve being free to move endwise but held against relative rotation, a housing for said valve mechanism, with ports and passages in said housing co-operating with the ports and passages of the sleeves, there being relative rotation between the housing and the valve sleeves, thereby to alternately admit and exhaust the fluid pressure to and from the opposite ends of each cylinder, with some of said ports relatively arranged to cut off the fluid pressure and enable the pistons to complete their stroke by expansion of the fluid in the cylinders, and means for shifting said endwise movable sleeve axially thereof, said ports and passages being relatively disposed in position whereby said axial movement is effective either to start or stop the motion of the engine, with cutting off and expansion of the fluid in each end of every cylinder for both forward and backward motion of the engine.

2. A structure as specified in claim 1, said shaft being rotatably mounted, and said valve sleeves formed and arranged as stated rotating therewith, said housing being held against rotation.

3. A structure as specified in claim 1, said cylinders being rotatably mounted, said shaft being held against rotation, and said valve sleeves formed and arranged as stated being held against rotation, said housing being rotatable.

4. A structure as specified in claim 1, said valve sleeves formed and arranged as stated being three in number, telescoped one within the other, the outermost sleeve being the one which is axially movable, and the other sleeve being rigidly united.

5. A structure as specified in claim 1, said shifting means comprising a rotary reverse valve co-operating with said endwise movable sleeve to reverse the motion of the engine, there being a lost motion connection between said rotary valve and said endwise movable sleeve, the cylinders being stationary, and the shaft being supported for rotation with said sleeve thereon.

6. A structure as specified in claim 1, there being fluid pressure admission and exhaust ports in the housing encircling said valve sleeves, directly engaging the outermost sleeve, for feeding and exhausting the fluid pressure to and from said valve mechanism, with said admission and exhaust ports co-operating with said outermost valve sleeve to reverse the motion of the engine.

7. In a double-acting fluid pressure engine of the type having radially arranged cylinders and a crank shaft to which all of the pistons are connected, a fluid pressure controlling valve mechanism sleeved on said shaft for cutting off the admission and causing expansion of the fluid in each end of the cylinder, comprising three telescoped concentric sleeves on said shaft keyed together and to said shaft to prevent relative rotation between them and to prevent relative rotation between each sleeve and the shaft, with co-operating ports and passages in the sides of said sleeves, two inner sleeves being rigidly but removably fixed on said shaft and the outer sleeve being free to move endwise but held against relative rotation, a housing for said valve mechanism, engaging said outer sleeve, with ports and passages in said housing co-operating with the ports and passages of the sleeves, there being relative rotation between the housing and the valve sleeves, thereby to alternately admit and exhaust the fluid pressure to and from the opposite ends of each cylinder, with some of said ports relatively arranged to cut off the fluid pressure and enable the pistons to complete their stroke by expansion of the fluid in the cylinders, and means mounted on the outer end thereof for shifting said endwise movable sleeve axially thereof, said ports and passages being relatively disposed in position whereby said axial movement is effective either to start or stop the motion of the engine, with cutting off and expansion of the fluid in each end of every cylinder for both forward and backward motion of the engine, said shifting means comprising a rotary reverse valve co-operating with said endwise movable sleeve to reverse the motion of the engine, there being a lost motion connection between said rotary valve and the swivel of said endwise movable sleeve, the cylinders being stationary, and the shaft being supported for rotation with said sleeve thereon.

HANS PASCOLINI.